(12) United States Patent
Chak et al.

(10) Patent No.: US 12,246,836 B2
(45) Date of Patent: Mar. 11, 2025

(54) MOVEABLE SHROUD MEMBER

(71) Applicant: Safran Seats USA LLC, Gainesville, TX (US)

(72) Inventors: Igor Chak, Los Angeles, CA (US); Reza Mansouri, Santa Fe Springs, CA (US); Romain Tranier, Costa Mesa, CA (US); Charles Michael Parker, Irvine, CA (US); Amen Omoragbon, Westminster, CA (US); Gokul Ramarathnam, Irvine, CA (US); Anthony Tran, Huntington Beach, CA (US)

(73) Assignee: Safran Seats USA LLC, Gainesville, TX (US)

( * ) Notice: Subject to any disclaimer, the term of this patent is extended or adjusted under 35 U.S.C. 154(b) by 111 days.

(21) Appl. No.: 17/797,877

(22) PCT Filed: Mar. 6, 2020

(86) PCT No.: PCT/US2020/021386
§ 371 (c)(1),
(2) Date: Aug. 5, 2022

(87) PCT Pub. No.: WO2021/177971
PCT Pub. Date: Sep. 10, 2021

(65) Prior Publication Data
US 2023/0059294 A1 Feb. 23, 2023

(51) Int. Cl.
*B64D 11/00* (2006.01)
*B60N 3/00* (2006.01)
*B64D 11/06* (2006.01)

(52) U.S. Cl.
CPC ........ *B64D 11/00151* (2014.12); *B60N 3/004* (2013.01); *B64D 11/0638* (2014.12)

(58) Field of Classification Search
CPC .. B64D 11/0015; B64D 11/0638; B60N 3/004
See application file for complete search history.

(56) References Cited

U.S. PATENT DOCUMENTS

| 3,594,037 A | 7/1971 | Sherman et al. |
| 6,412,870 B1 | 7/2002 | Higgins et al. |
(Continued)

FOREIGN PATENT DOCUMENTS

| CN | 1847049 A | 10/2006 |
| CN | 102361795 A | 2/2012 |
(Continued)

OTHER PUBLICATIONS

International Patent Application No. PCT/US2020/021386, International Search Report and Written Opinion, dated Nov. 19, 2020.
(Continued)

*Primary Examiner* — Anthony D Barfield
(74) *Attorney, Agent, or Firm* — Kilpatrick Townsend & Stockton LLP

(57) ABSTRACT

Described is a passenger seat assembly that may include a seat back including a rearward surface, a seat shroud positioned proximate to the rearward surface of the seat back and fixedly coupled to a seat frame, wherein the seat shroud remains stationary as the seat back moves between a stowed position and a deployed position, and at least one moveable shroud member coupled to the seat shroud at an attachment point and positioned proximate a rearward surface of the seat shroud, wherein a location of the attachment point is adjustable.

20 Claims, 7 Drawing Sheets

(56) References Cited

U.S. PATENT DOCUMENTS

| | | |
|---|---|---|
| 8,857,911 B2 | 10/2014 | Aguirre et al. |
| 11,964,767 B2 | 4/2024 | Mansouri et al. |
| 2002/0175547 A1 | 11/2002 | Bentley |
| 2003/0025371 A1 | 2/2003 | Veneruso |
| 2009/0200422 A1 | 8/2009 | Johnson et al. |
| 2011/0278885 A1 | 11/2011 | Procter et al. |
| 2012/0313403 A1 | 12/2012 | Aguirre et al. |
| 2014/0159440 A1 | 6/2014 | Porter |
| 2015/0329209 A1 | 11/2015 | Muirhead |
| 2017/0283060 A1 | 10/2017 | Papke et al. |
| 2018/0222589 A1 | 8/2018 | Papke et al. |
| 2019/0283644 A1 | 9/2019 | Smith et al. |

FOREIGN PATENT DOCUMENTS

| | | | |
|---|---|---|---|
| CN | 104340101 | A | 2/2015 |
| CN | 105102263 | A | 11/2015 |
| CN | 105173089 | A | 12/2015 |
| CN | 108422905 | A | 8/2018 |
| CN | 110194082 | A | 9/2019 |
| DE | 202004008069 | U1 | 7/2004 |
| DE | 102017205800 | A1 | 10/2018 |

OTHER PUBLICATIONS

U.S. Appl. No. 17/762,299, Notice of Allowance, Jan. 9, 2024, 9 pages.
International Appl. No. PCT/US2019/053810, International Preliminary Report on Patentability, Apr. 14, 2022, 8 pages.
International Appl. No. PCT/US2019/053810, International Search Report and Written Opinion, May 29, 2020, 11 pages.
Chinese Application No. 201980100934.3, Office Action, mailed on May 6, 2024, 8 pages (6 pages of original document and 2 pages of English Translation).
Chinese Application No. 202080098128.X, Office Action, mailed on Apr. 29, 2024, 14 pages (12 pages of original document and 2 pages of English Translation).
European Application No. 19789845.5, Intention to Grant, mailed on Apr. 15, 2024, 8 pages.
European Application No. 20716291.8, Intention to Grant, mailed on Apr. 17, 2024, 8 pages.
Chinese Application No. 202080098128.X, Office Action mailed on Nov. 29, 2024, 9 pages (7 pages of Original Document and 2 pages of English Translation).

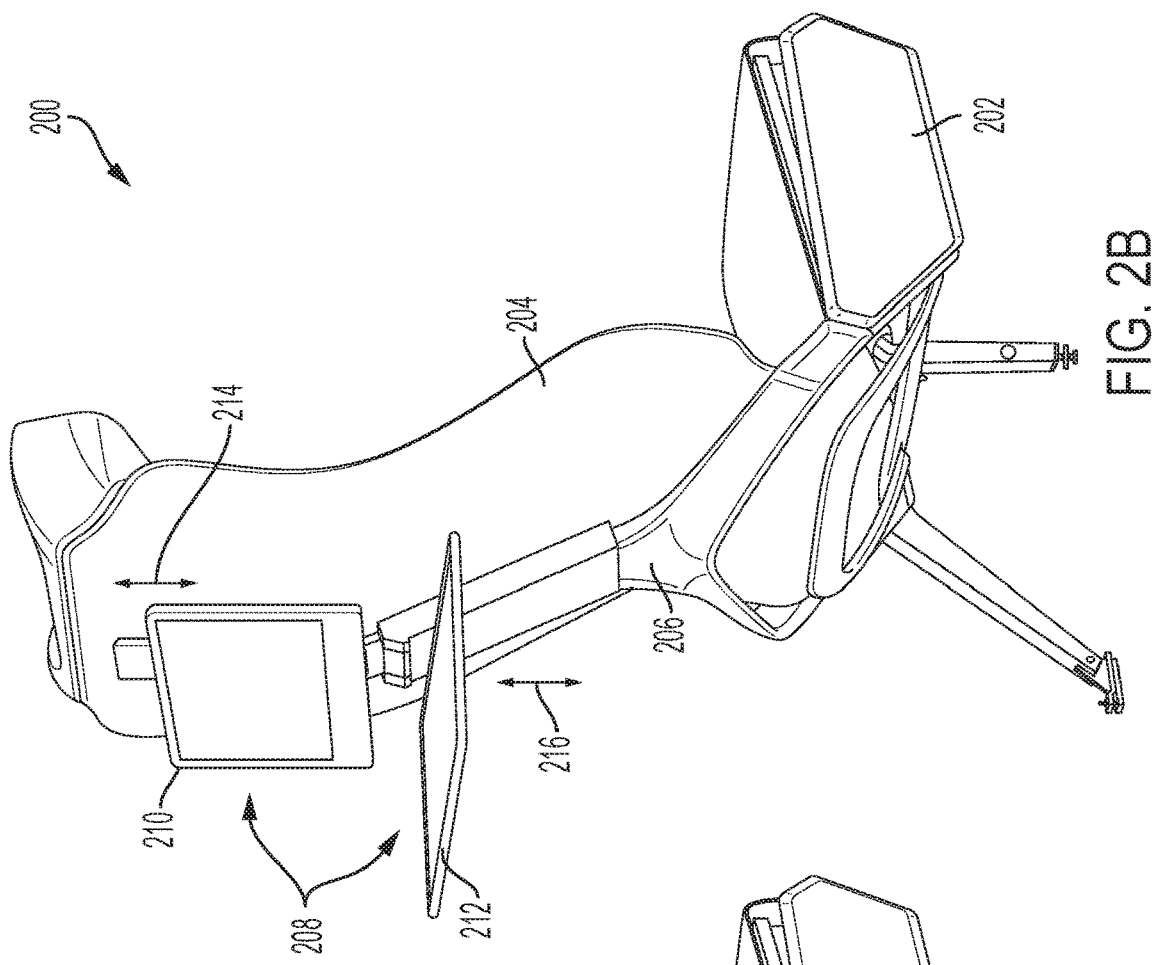
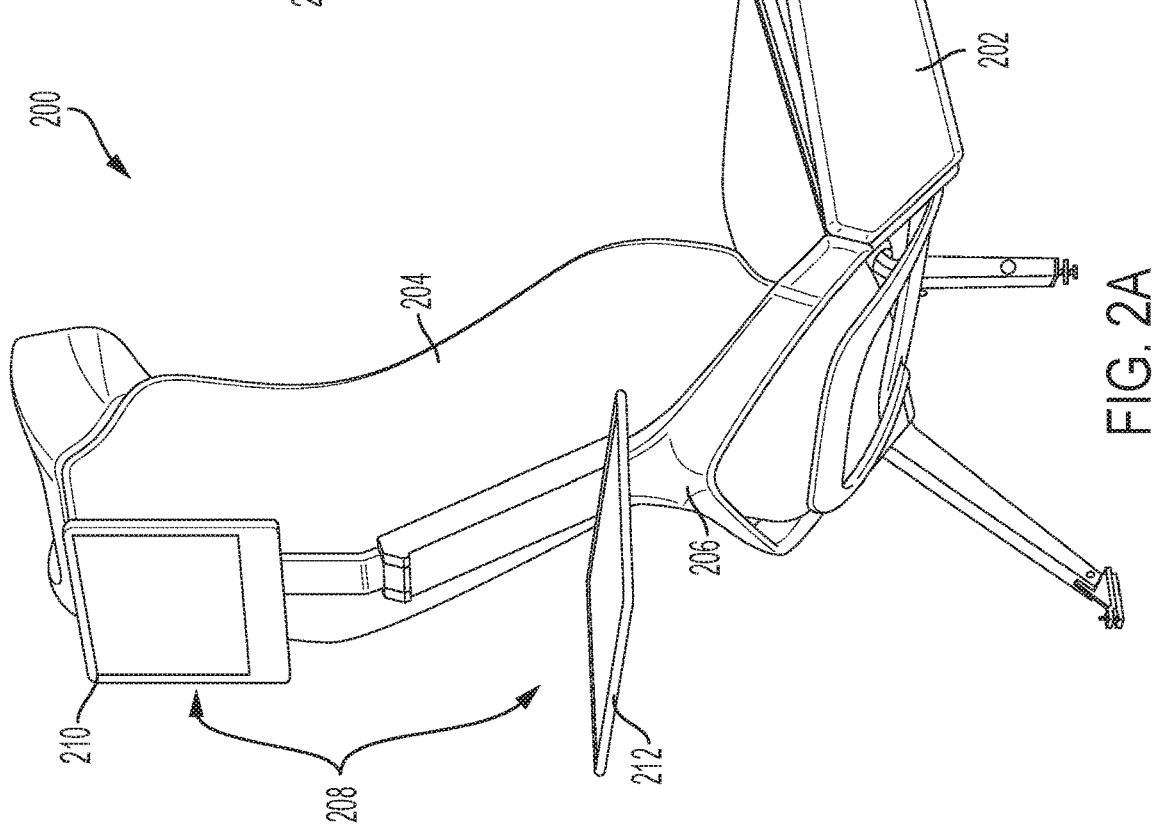

MOVEABLE SHROUD MEMBER

FIELD OF THE INVENTION

The field of the invention relates to moveable shroud members for passenger vehicles such as aircrafts.

BACKGROUND

Conventionally in aircrafts, seat-back shrouds in economy class seats are attached to the rearward facing surface of the seat back of a passenger seat, and any in-flight-entertainment screens, tray tables, literature pockets, etc. are immovably embedded in or attached to the seat-back shroud. Thus the size, location, and potential movability of the in-flight-entertainment screens, tray tables, literature pockets, etc. are limited by the design of the seat-back shroud. Additionally, the in-flight-entertainment screens, tray tables, literature pockets, etc. of these conventional passenger seats incorporate extra components that enable an orientation of the in-flight-entertainment screens, tray tables, literature pockets, etc. to be adjusted as the seat back of the passenger seat is adjusted but add additional weight to the aircraft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly comprises a seat back comprising a rearward surface; a seat shroud positioned proximate to the rearward surface of the seat back and fixedly coupled to a seat frame, wherein the seat shroud remains stationary as the seat back moves between a stowed position and a deployed position; and at least one moveable shroud member coupled to the seat shroud at an attachment point and positioned proximate a rearward surface of the seat shroud, wherein a location of the attachment point is adjustable.

In some embodiments, the at least one moveable shroud member comprises at least one of a monitor screen, a tray table, a reading light, a cup holder, a literature pocket, a personal electronic device holder, or a headrest.

In certain embodiments, the adjustable location of the attachment point adjusts a location of the moveable shroud member relative to the seat shroud.

The at least one moveable shroud member, in some embodiments, is interchangeable with at least one second moveable shroud member.

In some embodiments, the at least one moveable shroud member remains stationary as the seat back moves between the stowed position and the deployed position.

In certain embodiments, the seat shroud permits access to at least a portion of the rearward surface of the seat back.

The seat shroud, in some embodiments, comprises a substantially tubular shape.

According to certain embodiments of the present invention, a moveable shroud member comprises an attachment member, wherein: the moveable shroud member is coupled to a seat shroud at an attachment point using the attachment member, the seat shroud comprises a universal receptor configured to receive the attachment member, the attachment member comprises a universal coupling configured to fit with the universal receptor of the seat shroud, a location of the attachment point on the seat shroud is adjustable, and the seat shroud is positioned proximate to a rearward surface of a seat back, wherein the seat shroud remains stationary as the seat back moves between a stowed position and a deployed position.

The moveable shroud member, in certain embodiments, comprises at least one of a monitor screen, a tray table, a reading light, a cup holder, a literature pocket, a personal electronic device holder, or a headrest.

In some embodiments, the attachment member comprises at least one of a snap-fit coupling or a friction-fit coupling.

In certain embodiments, the attachment member at least partly surrounds at least a portion of the seat shroud.

The moveable shroud member, in some embodiments, must be removed from the seat shroud using a moveable shroud member removing tool.

The location of the attachment point on the seat shroud, in certain embodiments, is adjustable without using the moveable shroud member removing tool.

According to certain embodiments of the present invention, a seat shroud system comprises a seat shroud positioned proximate to a rearward surface of a seat back, wherein the seat shroud remains stationary as the seat back moves between a stowed position and a deployed position; at least one interchangeable-moveable shroud member coupled to the seat shroud at an attachment point, wherein a location of the attachment point is adjustable; and at least one attachment member configured to attach the interchangeable-moveable shroud member to the seat shroud at the attachment point, wherein the seat shroud comprises a universal receptor configured to be compatible with the at least one attachment member.

In certain embodiments, the seat shroud comprises a substantially tubular shape.

In some embodiments, the at least one attachment member comprises a universal coupling configured to fit with the universal receptor of the seat shroud.

The at least one interchangeable-moveable shroud member, in some embodiments, must be removed from the seat shroud using a moveable shroud member removing tool.

In certain embodiments, the seat shroud system further comprises at least one second interchangeable-moveable shroud member coupled to the seat shroud at a second attachment point, wherein the location of the second attachment point is adjustable and the at least one second interchangeable-moveable shroud member replaces the at least one interchangeable moveable shroud member; and at least one second attachment member configured to attach the at least one second interchangeable-moveable shroud member to the seat shroud at the attachment point.

The at least one attachment member, in certain embodiments, comprises at least one of a snap-fit coupling or a friction-fit coupling.

In some embodiments, the at least one interchangeable-moveable shroud member remains stationary as the seat back moves between the stowed position and the deployed position.

BRIEF DESCRIPTION OF THE DRAWINGS

FIG. 2A is a rear perspective view of a passenger seat assembly with moveable shroud members attached to a stationary shroud, according to certain embodiments of the present invention.

FIG. 2B is a rear perspective view of the passenger seat assembly of FIG. 2A with the location of the moveable shroud members on the stationary shroud adjusted.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide moveable shroud members attachable to a stationary shroud for passenger seats with the moveable shroud members being moveable along the stationary shroud. While the moveable shroud members are discussed for use with aircraft seats, they are by no means so limited. Rather, embodiments of the moveable shroud members may be used in passenger seats or other seats of any type or otherwise as desired.

Figure 1B:
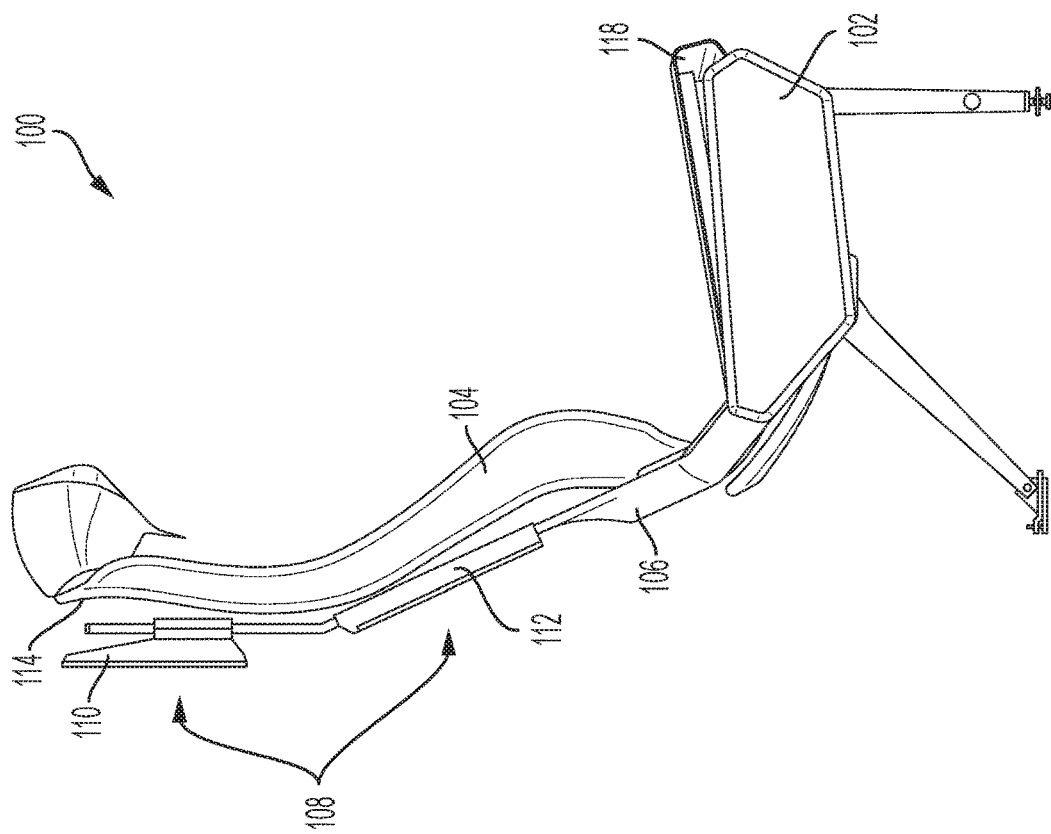
FIG. 1B is a left side view of the passenger seat assembly of FIG. 1A.
Figure 1A:
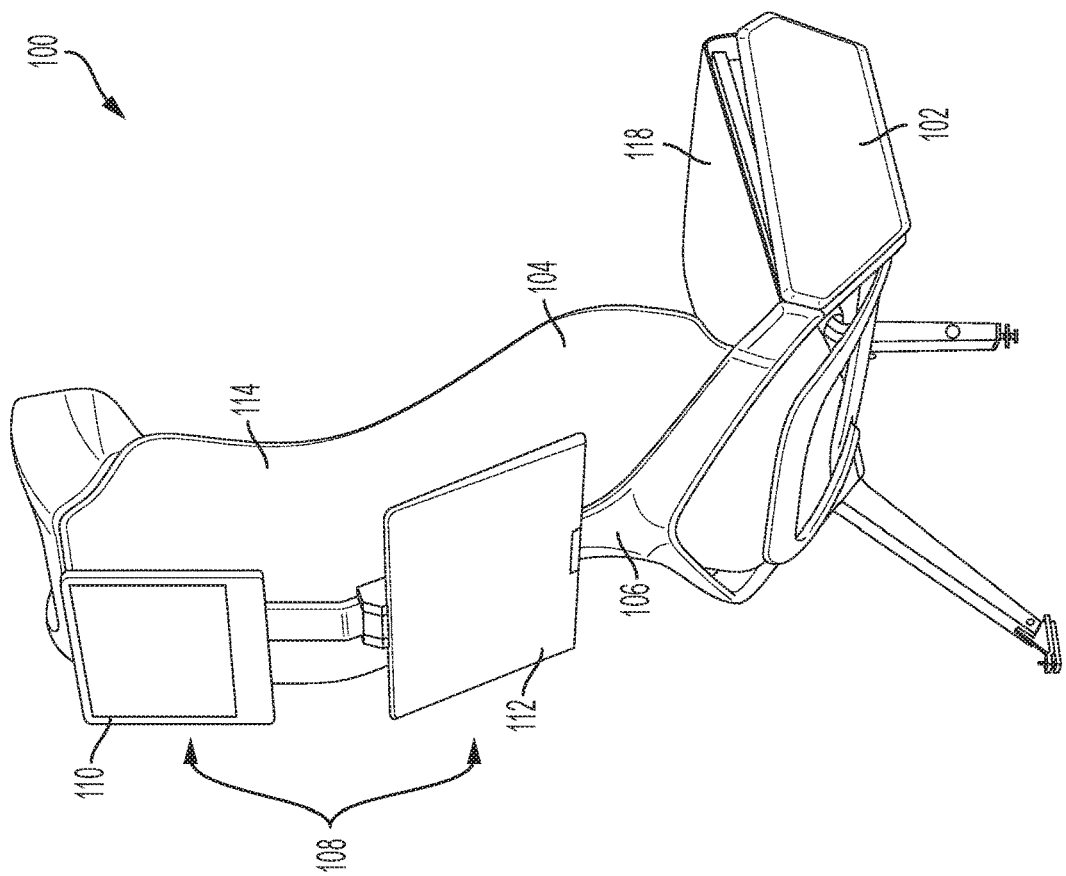
FIG. 1A is a rear perspective view of a passenger seat assembly with moveable shroud members attached to a stationary shroud, according to certain embodiments of the present invention.
Figure 1C:
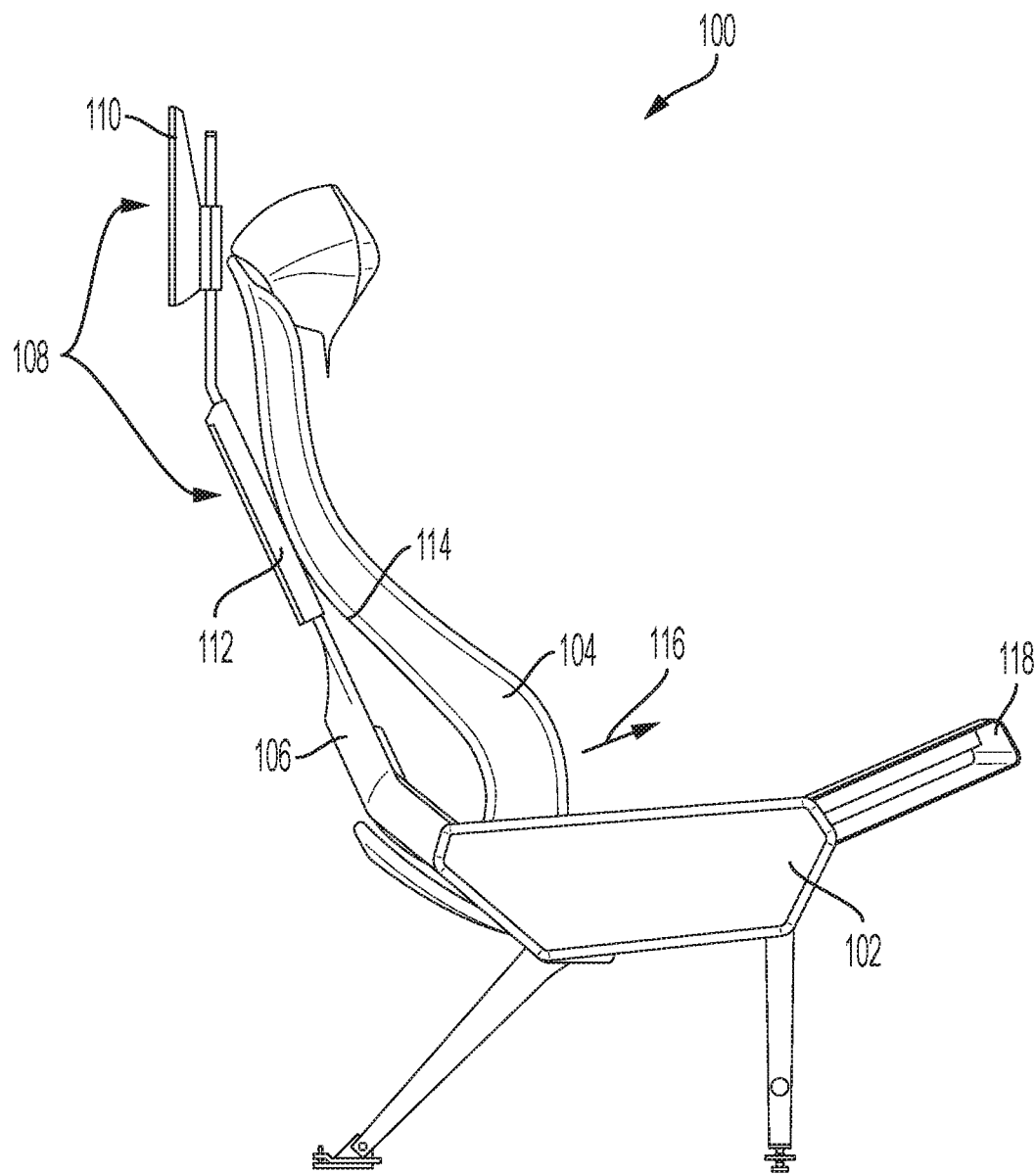
FIG. 1C is a left side view of the passenger seat assembly of FIG. 1A moving from a stowed position to a deployed position.

According to certain embodiments of the present invention, as shown in FIGS. 1A-1C, moveable shroud members 108 are attached to a stationary shroud 106, which may also be referred to as a seat shroud. The stationary shroud 106 is part of a passenger seat assembly 100. The passenger seat assembly 100 may also include a seat frame 102, a seat back 104, a seat pan 118, and the stationary shroud 106, e.g., a monitor shroud, a seat shroud, or a non-intrusive stationary shroud. In some embodiments, the moveable shroud members 108 may include a video monitor screen 110 or a tray table 112. The moveable shroud members 108 may include additional devices, which are discussed in further detail below in relation to FIG. 9.

The seat frame 102, the seat back 104, the stationary shroud 106, the moveable shroud members 108, and the seat pan 118 may be formed of materials including but not limited to aluminum, stainless steel, aramid fibers, polycarbonate, polypropylene, other metallic materials, composite materials, or other suitable materials. In some embodiments, the video monitor screen 110 may include a plasma display, a liquid crystal display, an organic light-emitting diode display, a projector, or any other suitable screen or device for displaying images. Each of the seat frame 102, the seat back 104, the stationary shroud 106, the moveable shroud members 108, and the seat pan 118 may be formed from the same material, from different materials, or from a combination of the same and different materials. For example, the seat frame 102 and the seat back 104 may both be formed of aluminum, the stationary shroud 106 may be formed from polycarbonate, and the moveable shroud members 108 may be formed from composite materials. In certain embodiments, the seat back 104, the moveable shroud members 108, and the seat pan 118 may be covered by a cushioning material.

In some embodiments, the seat back 104 may be supported by the seat frame 102, and the seat frame 102 may be coupled with a seat track fitting to secure the seat frame 102, and thus the passenger seat assembly 100, to the floor of the passenger vehicle. The seat back 104 may include a rearward surface 114, which is opposite a forward surface that a passenger sitting in the passenger seat assembly 100 comes into contact with.

In some embodiments, the stationary shroud 106 may be fixedly attached to any suitable stationary surface found within the passenger vehicle, such as the seat frame 102, the seat track, a floor surface, a wall surface, a ceiling surface, an overhead bin surface, etc. For example, the stationary shroud 106 may be integrally formed with the floor surface or may be secured to the wall surface using any suitable attachment, e.g., screws, nuts and bolts, glue, sealant, a snap-fit design, a friction-fit design, welding, melting, etc.

In some embodiments, as shown in FIGS. 1A-1C, the stationary shroud 106 is fixedly attached to the seat frame 102 and positioned proximate to, but separate from, the rearward surface 114 of the seat back 104. The positioning of the stationary shroud 106 may permit access to the rearward surface 114 of the seat back 104.

In some embodiments, the seat back 104 may be movable between a stowed position, e.g., a substantially upright position, and a deployed position, e.g., a substantially reclined position. This movement of the seat back 104 between the stowed position and the deployed position is represented by the arrow 116 in FIG. 1C. In some embodiments, the seat back 104 may be fixedly coupled to the seat pan 118 such that when the seat back 104 is moved between a stowed position and a deployed position the seat back 104 and the seat pan 118 move together through a cradle or rocking motion that includes the simultaneous translation and rotation of the seat back 104 and the seat pan 118. In further embodiments, the seat back 104 may be pivotally coupled to the seat pan 118 such that the seat back 104 may be moved between the stowed position and the deployed position by rotating the seat back 104 relative to the seat pan 118 as the seat pan 118 remains stationary.

According to certain embodiments of the present invention, such as shown in FIGS. 2A-2B, moveable shroud members 208 are attached to a stationary shroud 206 as part of a passenger seat assembly 200. The passenger seat assembly 200 may be similar to or the same as, or include similar or the same elements as, the passenger seat assembly 100 discussed above with respect to FIGS. 1A-1C. For example, the passenger seat assembly 200 may also include a seat frame 202, a seat back 204, and the stationary shroud 206.

The moveable shroud members 208 may include a video monitor screen 210 and/or a tray table 212, which may be the same as the video monitor screen 110 and the tray table 112 discussed above with respect to FIGS. 1A-1C. The moveable shroud members 208 are attached to the stationary shroud 206 at attachment points. Each moveable shroud member 208 may have one or more attachment points. For example, the video monitor screen 210 may be attached to the stationary shroud 206 at a first attachment point and a second attachment point and the tray table 212 may be attached to the stationary shroud 206 at a third attachment point. The first attachment point may be proximate an upper edge of the video monitor screen 210 and the second attachment point may be proximate a lower edge of the video monitor screen 210.

In some embodiments, the moveable shroud members 208 may be attached to the stationary shroud 206 without embedding the moveable shroud members 208 in the stationary shroud 206, the seat back 204, or any other feature of the passenger seat assembly 200. Attaching the moveable shroud members 208 to the stationary shroud 206 without embedding the moveable shroud members 208 in the stationary shroud 206 or seat back 204 provides designers with new and different design options for the passenger seat assembly 200.

For example, the seat back 204 may be designed without having to consider the placement of the moveable shroud members 208 on the seat back 204 or the potential effect that any movement of the seat back 204 between the stowed position and the deployed position might have on the moveable shroud members 208. Additionally, a larger variety of sizes of the moveable shroud members 208 may be used when the moveable shroud members 208 are attached to the stationary shroud 206 and are not embedded in the stationary shroud 206 or the seat back 204.

In some embodiments, the video monitor screen 210, or any other suitable moveable shroud member 208, may extend an entire width of the seat back 204 of the passenger seat assembly 200. Increasing the size of the video monitor screen 210 may permit increased functionality of the video monitor screen 210. For example, a passenger may be able to control their full environment, e.g., an overhead light, an amount of airflow from an overhead fan, a flight attendant call light, etc., all from the video monitor screen 210. Incorporating such functionality into the video monitor screen 210 means that the buttons or other mechanisms currently used to control those features may be removed from the aircraft or passenger vehicle. So the overall weight of the aircraft or passenger vehicle may be reduced.

In some embodiments, the location of the attachment point, or attachment points, of each moveable shroud member 208 on the stationary shroud 206 may be adjustable. This adjustable attachment point may permit the moveable shroud members 208 to be moved to various locations along the stationary shroud 206. For example, the arrow 214 and the arrow 216 represent potential movement of the video monitor screen 210 and the tray table 212, respectively, as the location of each attachment point is adjusted. The moveable shroud members 208 may be arranged so that each moveable shroud member 208 is capable of independent movement or so that multiple moveable shroud members 208 may be moved in unison. A passenger may adjust the attachment point of the moveable shroud members 208 based on the passenger's height or any other factor to increase the passenger's comfort level, to adjust the amount of living space available to the passenger, to allow for easier access to the moveable shroud members 208, etc.

In some embodiments, the moveable shroud members 208 may be coupled with the stationary shroud 206 using a tilting mechanism that permits the angle of the movable shroud member 208 relative to the stationary shroud 206 to be adjusted by pivoting the moveable shroud members 208. In further embodiments, the moveable shroud members 208 may be coupled with the stationary shroud 206 without incorporating such a tilting mechanism. Because the moveable shroud members 208 are coupled with the stationary shroud 206, the angle of the moveable shroud members 208 is not affected by any movement of the seat back 204.

In some embodiments, the moveable shroud members 208 may slide along the stationary shroud 206 to adjust the attachment points. In further embodiments, the moveable shroud members 208 may be detached from the stationary shroud 206 and then reattached to the stationary shroud 206 to adjust the location of the attachment point of each moveable shroud member 208. For example, the video monitor screen 210 may be removed from the location on the stationary shroud 206 seen in FIG. 2A and reattached to the attachment point on the stationary shroud 206 seen in FIG. 2B. Additionally, the moveable shroud member 208 may be interchangeable. For example, the video monitor screen 210 may be removed from the stationary shroud 206 and a different video monitor screen 210, or a different type of moveable shroud member 208, may be attached to the stationary shroud 206. So the size, style, features, etc. of the moveable shroud member 208 may be changed by switching one moveable shroud member 208 for another moveable shroud member 208.

Figure 3:
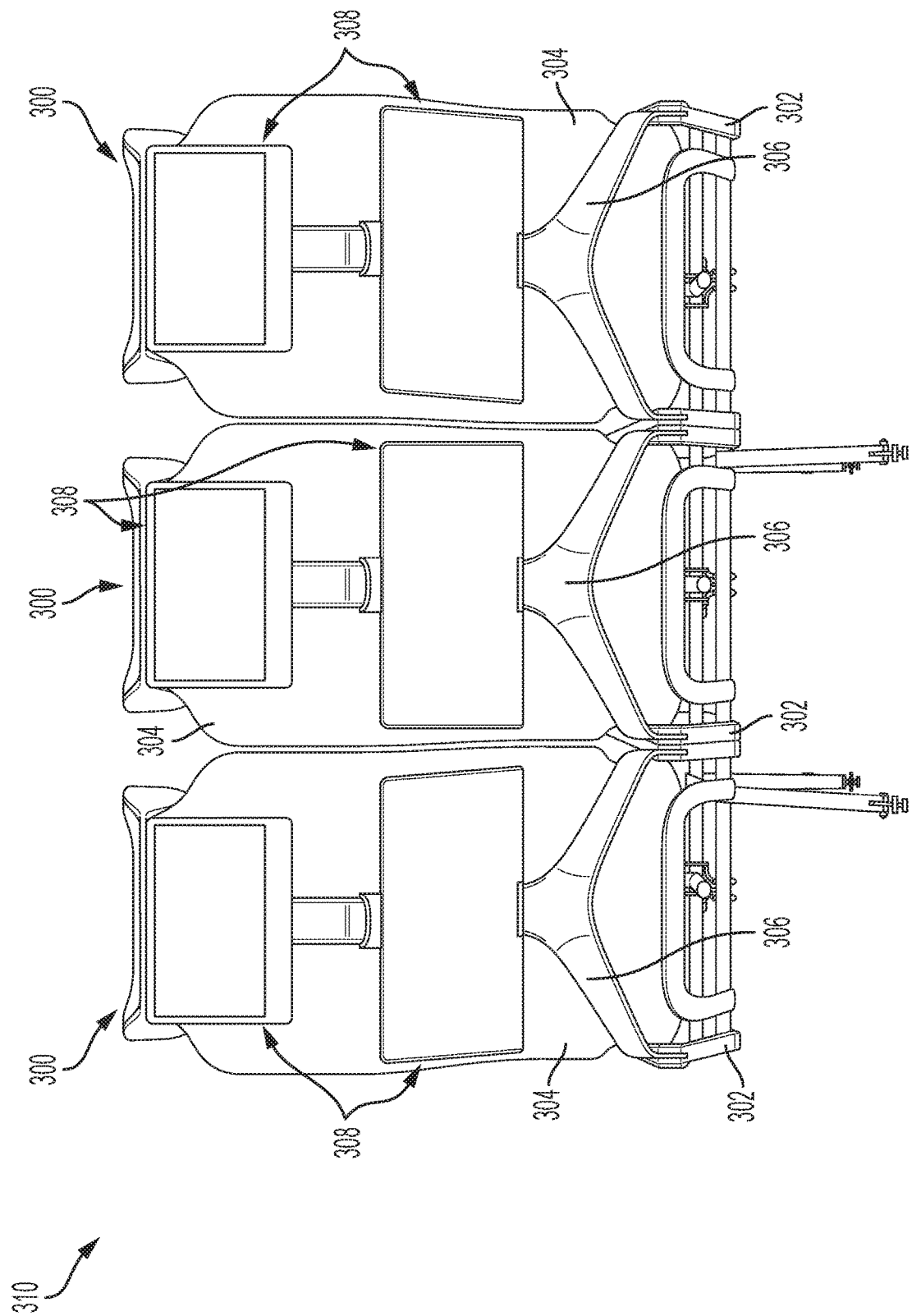
FIG. 3 is a rear view of a passenger seat assembly with moveable shroud members attached to a stationary shroud installed in a row of passenger seat assemblies, according to certain embodiments of the present invention.

According to certain embodiments of the present invention, such as shown in FIG. 3, a passenger seat row 310 may include multiple individual passenger seat assemblies 300 arranged proximate to one another in a row. The individual passenger seat assemblies 300 may be similar to or the same as, or include similar or the same elements as, the passenger seat assemblies 100, 200 discussed above with respect to FIGS. 1A-1C and FIGS. 2A-2B, respectively. For example, the passenger seat assembly 300 may include a seat frame 302, a seat back 304, a stationary shroud 306, and moveable shroud members 308 attached to the stationary shroud 306.

Figure 5:
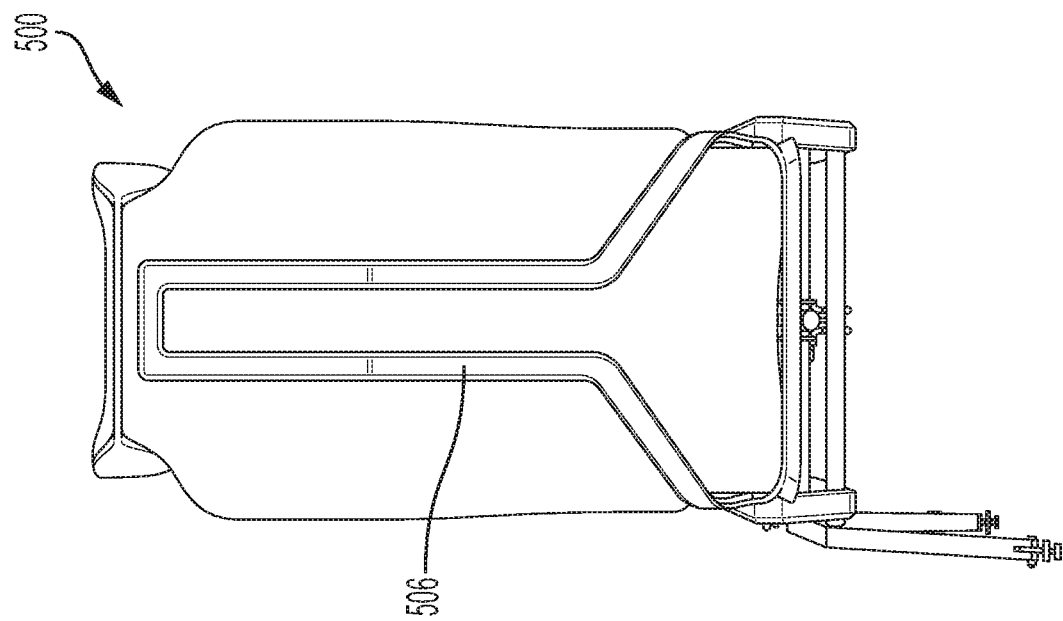
FIG. 5 is a rear view of a passenger seat assembly with a stationary shroud, according to certain embodiments of the present invention.
Figure 4:
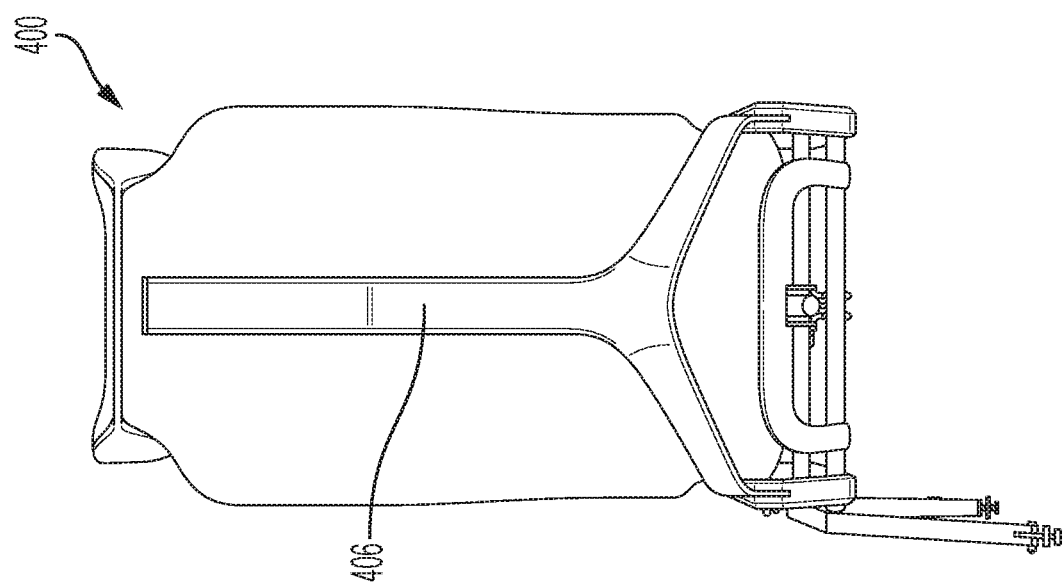
FIG. 4 is a rear view of a passenger seat assembly with a stationary shroud, according to certain embodiments of the present invention.

As shown in FIGS. 4 and 5, a stationary shroud 406, 506 may include any suitable shape or design. In some embodiments, the stationary shroud 406, 506 may be part of a passenger seat assembly 400, 500. The passenger seat assembly 400, 500 and the stationary shroud 406, 506 may be the same as or similar to the passenger seat assembly 100-300 and the stationary shroud 106-306 discussed above in reference to FIGS. 1A-3, respectively.

In some embodiments, as is shown in FIG. 4, the stationary shroud 406 may be substantially tubular shaped or include a substantially tubular shaped portion. The substantially tubular shape may have a circular, rectangular, triangular, oval, square, diamond, or any other suitably shaped cross-section. The stationary shroud 406 may extend substantially vertically or in any other suitable direction and may be positioned substantially centrally, proximate a right edge, proximate a left edge, or in any other suitable position relative to the passenger seat assembly 400.

In some embodiments, as is shown in FIG. 5, the stationary shroud 506 may be shaped similar to an elongated-upside-down U shape. While FIGS. 4 and 5 show various embodiments of the stationary shroud 406, 506, the stationary shroud 406, 506 may be shaped and arranged within the passenger seat assembly 400, 500 in any suitable manner.

Figure 6:
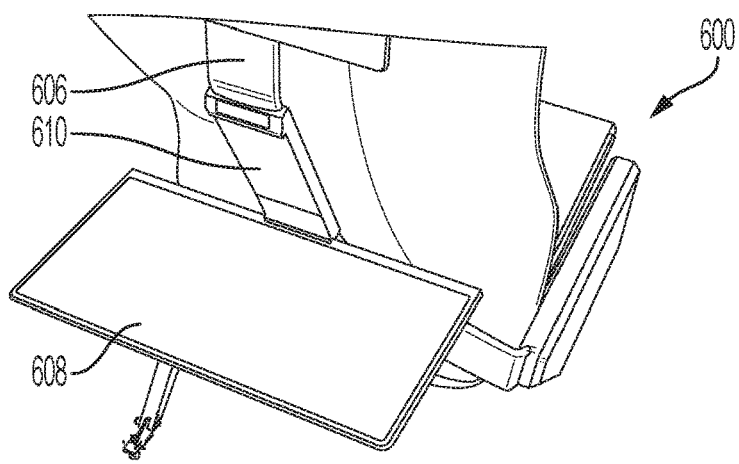
FIG. 6 is a partial perspective view of a passenger seat assembly with a moveable shroud member attached to a stationary shroud using a snap-fit connection, according to certain embodiments of the present invention.
Figure 7:
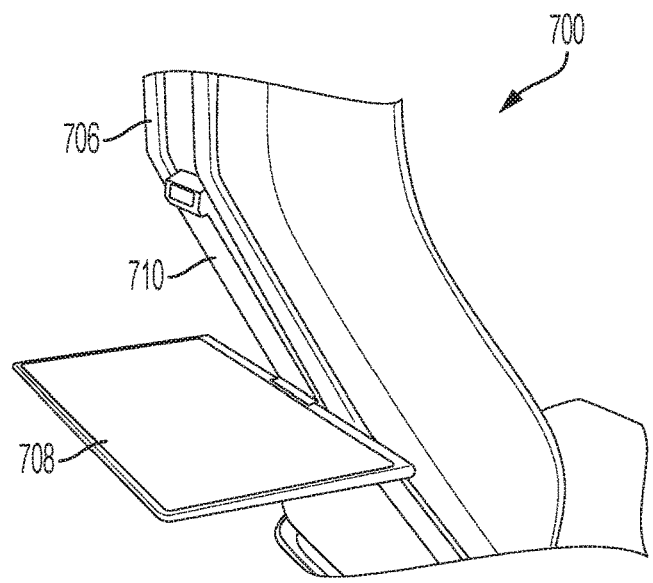
FIG. 7 is a partial perspective view of a passenger seat assembly with a moveable shroud member attached to a stationary shroud using a friction-fit connection, according to certain embodiments of the present invention.
Figure 8:
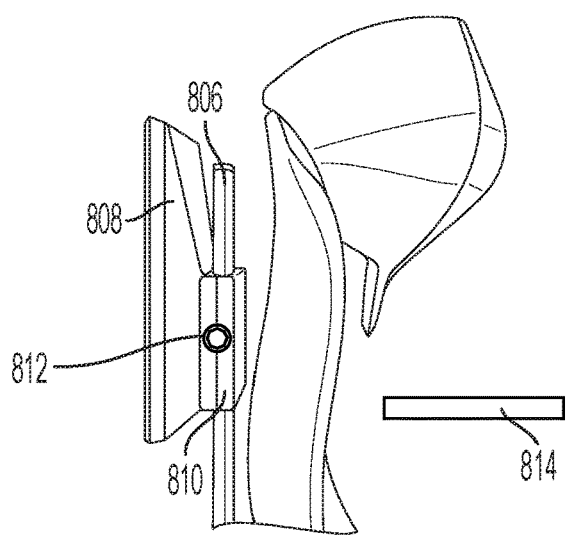
FIG. 8 is a partial perspective view of a passenger seat assembly with a moveable shroud member attached to a stationary shroud using a connection that fully surrounds the stationary shroud, according to certain embodiments of the present invention.

According to certain embodiments of the present invention, such as shown in FIGS. 6-8, moveable shroud members 608, 708, 808 are attached to a stationary shroud 606, 706, 806 as part of a passenger seat assembly 600, 700, 800. The passenger seat assembly 600, 700, 800 may be similar to or the same as, or include similar or the same elements as, the passenger seat assembly 100-500 and the stationary shroud 106-506, discussed above in reference to FIGS. 1A-5.

In some embodiments, the moveable shroud member 608 may be attached to the stationary shroud 606 at an attachment point using an attachment member 610. The location of the attachment point of the moveable shroud member 608 may be changed by either moving the moveable shroud member 608 along the attachment member 610 or by moving the attachment member 610 along the stationary shroud 606. The attachment member 610 may attach to the stationary shroud 606 using a snap-fit coupling or connection. In further embodiments, the moveable shroud member 608 may be directly coupled to the stationary shroud 606 at an attachment point without the use of the attachment member 610.

In some embodiments, the attachment member 610 may have a universal coupling that fits with a universal receptor of the stationary shroud 606 so that the universal receptor may receive the attachment member 610. The universal receptor of the stationary shroud 606 may be the shape of the stationary shroud 606, an indentation, opening, cut-through, etc. in the stationary shroud 606, or any other suitable feature that may permit the universal coupling to fit with the universal receptor. The universal receptor may enable any moveable shroud member 608 that has the corresponding universal coupling to attach to the stationary shroud 606.

The use of the universal receptor and the universal coupling may facilitate moving the moveable shroud member 608 along the stationary shroud 606 and/or interchanging one moveable shroud member 608 for a different moveable shroud member 608. For example, a first moveable shroud member 608 attached to the stationary shroud 606 may be removed from the stationary shroud 606 and replaced with a second moveable shroud member 608 that has a second attachment member 610 with the universal coupling. The universal coupling of the second attachment member 610 is compatible with the universal receptor of the stationary shroud 606 so that the second moveable shroud member 608 may be coupled with the stationary shroud 606 via the second attachment member 610 at an attachment point. The attachment point of the second moveable shroud member 608 may similarly be adjusted along the stationary shroud 606.

In some embodiments, as shown in FIG. 7, the moveable shroud member 708 may be attached to the stationary shroud 706 at an attachment point using an attachment member 710. The moveable shroud member 708, the stationary shroud 706, and the attachment member 710 may have all or some of the same or similar features as are described above with regards to the moveable shroud member 608, the stationary shroud 606, and the attachment member 610 shown in FIG. 6.

In some embodiments, the attachment member 710 may attach to the stationary shroud 706 using a friction-fit coupling or connection. Additionally, the stationary shroud 706 may have a universal receptor that is compatible with the attachment member 710 so that the stationary shroud 706 may receive the attachment member 710 and be coupled with the moveable shroud member 708. In further embodiments, the attachment member 710 may also have a universal coupling that fits with the universal receptor so that the moveable shroud member 708 may be attached to the stationary shroud 706.

In some embodiments, as shown in FIG. 8, the moveable shroud member 808 may be attached to the stationary shroud 806 at an attachment point using an attachment member 810. The moveable shroud member 808, the stationary shroud 806, and the attachment member 810 may have all or some of the same or similar features as are described above with regards to the moveable shroud member 608, 708 the stationary shroud 606, 706 and the attachment member 610, 710 shown in FIGS. 6, 7, respectively.

In some embodiments, the attachment member 810 may attach to the stationary shroud 806 and entirely surround a portion of the stationary shroud 806. The attachment member 810 may include a locking device 812 that requires a moveable member removing tool 814 to completely remove the moveable shroud member 808 from the stationary shroud 806. For example, the locking device 812 of the attachment member 810 may be a fastener with a specially designed head that only fits with a moveable member removing tool 814. The moveable shroud member 808 may be removed from the stationary shroud 806 when the fastener is removed or rotated a specific amount using the moveable member removing tool 814. The locking device 812 and the moveable member removing tool 814 may be any suitable compatible devices.

In further embodiments, the attachment member 810 may require the moveable member removing tool 814 to completely remove the moveable shroud member 808 from the stationary shroud 806, but the attachment point of the moveable shroud member 808 may be adjusted without the use of the moveable member removing tool 814. Being able to adjust the attachment point of the moveable shroud member 808 without needing the moveable member removing tool 814 may enable a passenger to adjust the location of the moveable shroud member 808 without removing the moveable shroud member 808 from the stationary shroud 806 and may reduce the risk of theft of the moveable shroud member 808.

Figure 9:
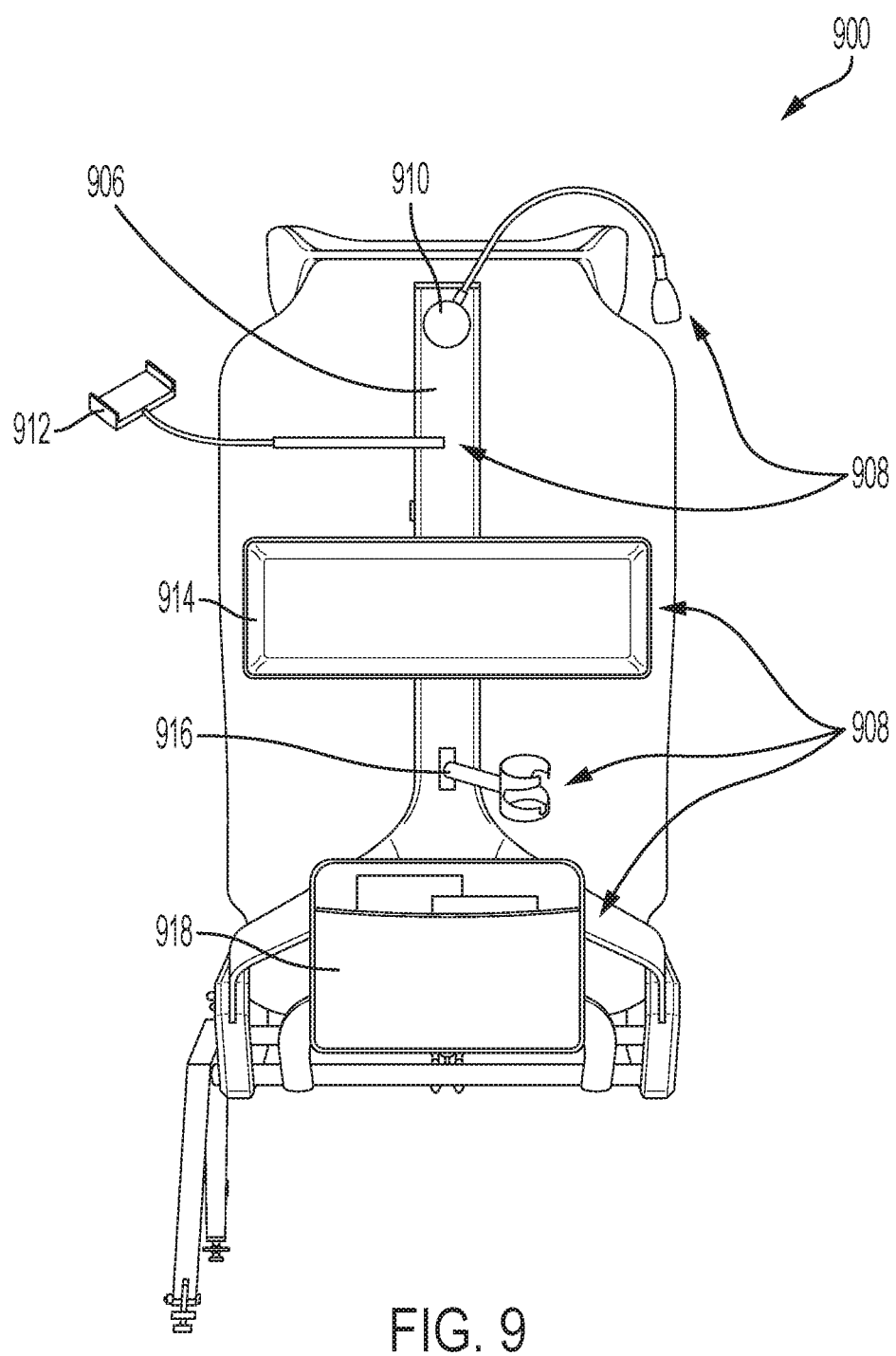
FIG. 9 is a rear view of a passenger seat assembly with moveable shroud members attached to a stationary shroud, according to certain embodiments of the present invention.

According to certain embodiments of the present invention, such as shown in FIG. 9, moveable shroud members 908 are attached to a stationary shroud 906 as part of a passenger seat assembly 900. The passenger seat assembly

900 may be similar to or the same as, or include similar or the same elements as, the passenger seat assembly 100-800 and the stationary shroud 106-806, discussed above in reference to FIGS. 1A-8, respectively.

In some embodiments, the moveable shroud members 908 may include a light source 910, a personal-electronic-device holder 912, a headrest 914, a cup holder 916, a literature pocket 918, or any other suitable element. The moveable shroud member 908 may be removably attached to the stationary shroud 906 in any arrangement and may be moved to various locations along the stationary shroud 906. Any suitable number, e.g., 1, 2, 3, 4, 5, etc., of moveable shroud members 908 may be attached to the stationary shroud 906 and the moveable shroud member 908 may also be attached to the stationary shroud 906 with a video monitor screen and/or a tray table.

In the following, further examples are described to facilitate the understanding of the invention:

Example #1. A passenger seat assembly (which may incorporate features of any of the subsequent examples) comprising: a seat back comprising a rearward surface; a seat shroud positioned proximate to the rearward surface of the seat back and fixedly coupled to a seat frame, wherein the seat shroud remains stationary as the seat back moves between a stowed position and a deployed position; and at least one moveable shroud member coupled to the seat shroud at an attachment point and positioned proximate a rearward surface of the seat shroud, wherein a location of the attachment point is adjustable.

Example #2. The passenger seat assembly of example #1 or any of the preceding or subsequent examples, wherein the at least one moveable shroud member comprises at least one of a monitor screen, a tray table, a reading light, a cup holder, a literature pocket, a personal electronic device holder, or a headrest.

Example #3. The passenger seat assembly of example #1 or any of the preceding or subsequent examples, wherein the adjustable location of the attachment point adjusts a location of the moveable shroud member relative to the seat shroud.

Example #4. The passenger seat assembly of example #1 or any of the preceding or subsequent examples, wherein the at least one moveable shroud member is interchangeable with at least one second moveable shroud member.

Example #5. The passenger seat assembly of example #1 or any of the preceding or subsequent examples, wherein the at least one moveable shroud member remains stationary as the seat back moves between the stowed position and the deployed position.

Example #6. The passenger seat assembly of example #1 or any of the preceding or subsequent examples, wherein the seat shroud permits access to at least a portion of the rearward surface of the seat back.

Example #7. The passenger seat assembly of example #1 or any of the preceding or subsequent examples, wherein the seat shroud comprises a substantially tubular shape.

Example #8. A moveable shroud member (which may incorporate features of any of the subsequent examples) comprising an attachment member, wherein: the moveable shroud member is coupled to a seat shroud at an attachment point using the attachment member, the seat shroud comprises a universal receptor configured to receive the attachment member, the attachment member comprises a universal coupling configured to fit with the universal receptor of the seat shroud, a location of the attachment point on the seat shroud is adjustable, and the seat shroud is positioned proximate to a rearward surface of a seat back, wherein the seat shroud remains stationary as the seat back moves between a stowed position and a deployed position.

Example #9. The moveable shroud member of example #8 or any of the preceding or subsequent examples, wherein the moveable shroud member comprises at least one of a monitor screen, a tray table, a reading light, a cup holder, a literature pocket, a personal electronic device holder, or a headrest.

Example #10. The moveable shroud member of example #8 or any of the preceding or subsequent examples, wherein the attachment member comprises at least one of a snap-fit coupling or a friction-fit coupling.

Example #11. The moveable shroud member of example #8 or any of the preceding or subsequent examples, wherein the attachment member at least partly surrounds at least a portion of the seat shroud.

Example #12. The moveable shroud member of example #8 or any of the preceding or subsequent examples, wherein the moveable shroud member must be removed from the seat shroud using a moveable shroud member removing tool.

Example #13. The moveable shroud member of example #12 or any of the preceding or subsequent examples, the location of the attachment point on the seat shroud is adjustable without using the moveable shroud member removing tool.

Example #14. A seat shroud system (which may incorporate features of any of the subsequent examples) comprising: a seat shroud positioned proximate to a rearward surface of a seat back, wherein the seat shroud remains stationary as the seat back moves between a stowed position and a deployed position; at least one interchangeable-moveable shroud member coupled to the seat shroud at an attachment point, wherein a location of the attachment point is adjustable; and at least one attachment member configured to attach the interchangeable-moveable shroud member to the seat shroud at the attachment point, wherein the seat shroud comprises a universal receptor configured to be compatible with the at least one attachment member.

Example #15. The seat shroud system of example #14 or any of the preceding or subsequent examples, wherein the seat shroud comprises a substantially tubular shape.

Example #16. The seat shroud system of example #14 or any of the preceding or subsequent examples, wherein the at least one attachment member comprises a universal coupling configured to fit with the universal receptor of the seat shroud.

Example #17. The seat shroud system of example #14 or any of the preceding or subsequent examples, wherein the at least one interchangeable-moveable shroud member must be removed from the seat shroud using a moveable shroud member removing tool.

Example #18. The seat shroud system of example #17 or any of the preceding or subsequent examples, further comprising: at least one second interchangeable-moveable shroud member coupled to the seat shroud at a second attachment point, wherein the location of the second attachment point is adjustable and the at least one second interchangeable-moveable shroud member replaces the at least one interchangeable moveable shroud member; and at least one second attachment member configured to attach the at least one second interchangeable-moveable shroud member to the seat shroud at the attachment point.

Example #19. The seat shroud system of example #14 or any of the preceding or subsequent examples, wherein the at least one attachment member comprises at least one of a snap-fit coupling or a friction-fit coupling.

Example #20. The seat shroud system of example #14 or any of the preceding examples, wherein the at least one interchangeable-moveable shroud member remains stationary as the seat back moves between the stowed position and the deployed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
    a seat back comprising a rearward surface;
    a seat shroud positioned proximate to the rearward surface of the seat back and fixedly coupled to a seat frame, wherein the seat shroud remains stationary as the seat back moves between a stowed position and a deployed position, and wherein the seat shroud permits access to at least a portion of the rearward surface of the seat back; and
    at least one moveable shroud member coupled to the seat shroud at an attachment point and positioned proximate a rearward surface of the seat shroud,
    wherein a location of the attachment point is adjustable.

2. The passenger seat assembly of claim 1, wherein the at least one moveable shroud member comprises at least one of a monitor screen, a tray table, a reading light, a cup holder, a literature pocket, a personal electronic device holder, or a headrest.

3. The passenger seat assembly of claim 1, wherein the adjustable location of the attachment point adjusts a location of the moveable shroud member relative to the seat shroud.

4. The passenger seat assembly of claim 1, wherein the at least one moveable shroud member is interchangeable with at least one second moveable shroud member.

5. The passenger seat assembly of claim 1, wherein the at least one moveable shroud member remains stationary as the seat back moves between the stowed position and the deployed position.

6. The passenger seat assembly of claim 1, wherein the moveable shroud member is coupled to a seat shroud at the attachment point using an attachment member comprising at least one of a snap-fit coupling or a friction-fit coupling.

7. The passenger seat assembly of claim 1, wherein the seat shroud comprises a substantially tubular shape.

8. A moveable shroud member comprising an attachment member, wherein:
    the moveable shroud member is coupled to a seat shroud at an attachment point using the attachment member,
    the seat shroud comprises a universal receptor configured to receive the attachment member,
    the attachment member comprises a universal coupling configured to fit with the universal receptor of the seat shroud,
    a location of the attachment point on the seat shroud is adjustable, and
    the seat shroud is positioned proximate to a rearward surface of a seat back, wherein the seat shroud remains stationary as the seat back moves between a stowed position and a deployed position, and wherein the seat shroud permits access to at least a portion of the rearward surface of the seat back.

9. The moveable shroud member of claim 8, wherein the moveable shroud member comprises at least one of a monitor screen, a tray table, a reading light, a cup holder, a literature pocket, a personal electronic device holder, or a headrest.

10. The moveable shroud member of claim 8, wherein the attachment member comprises at least one of a snap-fit coupling or a friction-fit coupling.

11. The moveable shroud member of claim 8, wherein the attachment member at least partly surrounds at least a portion of the seat shroud.

12. The moveable shroud member of claim 8, wherein the moveable shroud member must be removed from the seat shroud using a moveable shroud member removing tool.

13. The moveable shroud member of claim 12, the location of the attachment point on the seat shroud is adjustable without using the moveable shroud member removing tool.

14. A seat shroud system comprising:
    a seat shroud positioned proximate to a rearward surface of a seat back, wherein the seat shroud remains stationary as the seat back moves between a stowed position and a deployed position, and wherein the seat shroud permits access to at least a portion of the rearward surface of the seat back;
    at least one interchangeable-moveable shroud member coupled to the seat shroud at an attachment point, wherein a location of the attachment point is adjustable; and
    at least one attachment member configured to attach the interchangeable-moveable shroud member to the seat shroud at the attachment point,
    wherein the seat shroud comprises a universal receptor configured to be compatible with the at least one attachment member.

15. The seat shroud system of claim 14, wherein the seat shroud comprises a substantially tubular shape.

16. The seat shroud system of claim 14, wherein the at least one attachment member comprises a universal coupling configured to fit with the universal receptor of the seat shroud.

17. The seat shroud system of claim 14, wherein the at least one interchangeable-moveable shroud member must be removed from the seat shroud using a moveable shroud member removing tool.

18. The seat shroud system of claim 17, further comprising:
    at least one second interchangeable-moveable shroud member coupled to the seat shroud at a second attachment point, wherein the location of the second attachment point is adjustable and the at least one second interchangeable-moveable shroud member replaces the at least one interchangeable-moveable shroud member; and
    at least one second attachment member configured to attach the at least one second interchangeable-moveable shroud member to the seat shroud at the attachment point.

19. The seat shroud system of claim 14, wherein the at least one attachment member comprises at least one of a snap-fit coupling or a friction-fit coupling.

20. The seat shroud system of claim 14, wherein the at least one interchangeable-moveable shroud member remains stationary as the seat back moves between the stowed position and the deployed position.

\* \* \* \* \*